United States Patent [19]

Zhang et al.

[11] Patent Number: 5,091,913
[45] Date of Patent: Feb. 25, 1992

[54] QUARTZ CRYSTAL TUNING HE-NE DOUBLE FREQUENCY LASER

[75] Inventors: Shulian Zhang; Sen Yang; Minxian Wu; Kuofam Jin, all of Beijing, China

[73] Assignee: Tsinghua University, Beijing, China

[21] Appl. No.: 507,150

[22] Filed: Apr. 10, 1990

[51] Int. Cl.$^5$ .............................................. H01S 3/106
[52] U.S. Cl. ....................... 372/23; 372/105; 372/99; 372/20
[58] Field of Search ................. 372/23, 20, 105, 29, 372/55, 99; 350/401

[56] References Cited

U.S. PATENT DOCUMENTS

| | | | |
|---|---|---|---|
| 3,435,370 | 3/1969 | Harris et al. | 372/20 |
| 3,533,015 | 10/1970 | Wuerker | 512/105 |
| 3,549,236 | 12/1970 | Mink | 372/105 |
| 3,605,309 | 9/1971 | Harris et al. | 372/23 |
| 3,786,681 | 1/1974 | Keihn | 372/20 |
| 3,983,507 | 9/1976 | Tang et al. | 372/105 |
| 4,233,569 | 11/1980 | Liu | 372/105 |
| 4,398,293 | 9/1983 | Hall et al. | 372/32 |
| 4,745,606 | 5/1988 | Uehara et al. | 372/29 |

OTHER PUBLICATIONS

Born and Wolf *Principles of Optics*, Pergamon Press NY Section 14.3.2, 14.4.3 and 14.4.4, 1970.

*Primary Examiner*—William L. Sikes
*Assistant Examiner*—Susan S. Morse
*Attorney, Agent, or Firm*—Rines and Rines

[57] ABSTRACT

A birefringent quartz plate is inserted in the laser cavity to generate two orthogonal polarized beams with different frequencies, and with the amount of frequency difference depending upon the angle of orientation of the crystalline axis of the quartz plate with respect to the longitudinal axis of the laser beam in the cavity. Frequency differences between the generated dual frequency beams can be varied from tens of MHz to more than 1000 MHz, with tuning or variation being effected by a mechanism for rotating the quartz plate. This apparatus provides a dual-frequency laser for interferometry, laser Doppler velocimeters and other applications.

10 Claims, 1 Drawing Sheet

# QUARTZ CRYSTAL TUNING HE-NE DOUBLE FREQUENCY LASER

BACKGROUND OF THE INVENTION

This invention relates to He-Ne double frequency lasers for generating a large. Adjustable frequency difference and relates to a short He-Ne laser for getting stabilized power output.

The Current double frequency laser are based on combination of Zeeman affect and mode pulling affect. The laser is comprising of an ordinary He-Ne laser and a magnet that produces a longitudinal magnetic field along the core of the laser tube. This kind of laser is not possible to obtain a large frequency difference. In general the frequency difference is only about a few MHz, however in many applications a large frequency difference, such as tens MHz even one thousand MHz, is needed.

In laser interferometers, a large frequency difference is used to enhance its measurement speed. For example the Optodyn Co. (USA) has been using tens MHz in its interferometers. The method generating larger frequency difference is to split a laser beam from an ordinary laser into two beams, then put an acoustic-optic modulator (acoustic-optic frequency shifter) or Brag cell in the way of one of the beams for change its frequency so that a large frequency difference rises between the two laser beam.

Large frequency difference is employed in Doppler Velocimeters. Such as Polytec Co. (West Germany). G. Bouchard (IBM J. RES. Develop. Vol. 29 No.3. 1985) and R. W. Whezien(Optical Engineering, Vol. 25, No.4. 1984).

At National Institute of Metrology of China (NIM), a special method has been using to get 1070 MHz frequency difference. The scientists design an appropriate length of the He-Ne laser to make the empty mode interval be 1070 MHz. Then an appropriate, strong, longitudunal magnetic field is applied on the He-Ne laser to make the spectrum of Ne atoms split into two spectrum lines and to coincide the central frequency of the two spectrum with the neighboring two empty mode.

The object of this invention is to design a new kind of He-Ne double frequency lasers without both magnets and acoustic-optic modulators in order to reduce the cost and simplify construction of double frequency laser, double frequency laser interferometers and Doppler velocimeters. This laser can obtain various frequency difference, form a few MHz to more than one thousand, to match different applications.

As additional but important result of this invention a short, tens mm. and power-stabled He-Ne laser can be produced. Short He-Ne lasers available in current market whose cavity length is shorter than 100 mm are of unstable power output.

SUMMARY OF THE INVENTION

1. The main feature of this invention is to put a quartz crystal plate in an ordinary He-Ne laser's cavity. The crystalline of the plate makes an angle with the core of discharge tube.

The quartz crystal plate is a birefringent element having two principal directions. The refractive index of the light beam whose polarization direction is parallel to one principal direction of the quart crystal is different with the refractive index of the light beam whose polarization direction is parallel to other quartz crystal's principal direction. Therefore there are two optical path lengths in the quartz plate and two laser cavity length in a same laser cavity. Then two wave lengths will occur in a same cavity on formula:

$$L = \tfrac{1}{2} q \lambda$$

where:
L: cavity length,
λ: laser wave length,
q: a large positive and integral number.

Of course, there must be two frequencies in a same cavity. The difference of wave-length is very small, but the difference of the frequencies is very large. Now we get a laser beam containing two frequencies (Double frequency laser) from the laser. The larger the angle between crystalline of the quartz plate and laser beam in the cavity is, the larger the frequency difference is. The thicker the quartz crystal plate is, the larger the frequency difference is. In according to some our tests the frequency difference will be about half interval of longitudinal modes for the angle of 8° and thickness of 2.5 mm of the crystal plate.

2. As discuss above, it is known that the number of the frequency of the output of this invention is twice as many as the ordinary laser when they have the same cavity length so that number of longitudinal modes is doubled by the quartz crystal plate. From this result we can draw an important idea for improving the characteristic of the lasers whose cavity length is shorter than 100 mm.

As well know the power output of an ordinary He-Ne laser is very unstable, even the light disappears sometimes. The reason is that the mode interval will be larger than width of gain curve of 1500 MHz of Ne in the short cavity. In this case there is one mode workings sometimes or not any mode working at another time. So the power of the laser is variable even zero. Compared to the ordinary short He-Ne laser, this invention has twice as many as the frequencies of ordinary lasers. Even when the cavity length is 100 mm, there are two frequencies in the cavity always. Though the power of one of the two frequencies can increased or decreased with time, the total power of the two modes will change less. Proceed to the next step. We can produce such a He-Ne laser whose length is a few cm.

Brief Description of the Drawings

Three constructions of this invention are shown in FIG. 1.

Detailed Description of the Invention

Figure 1:
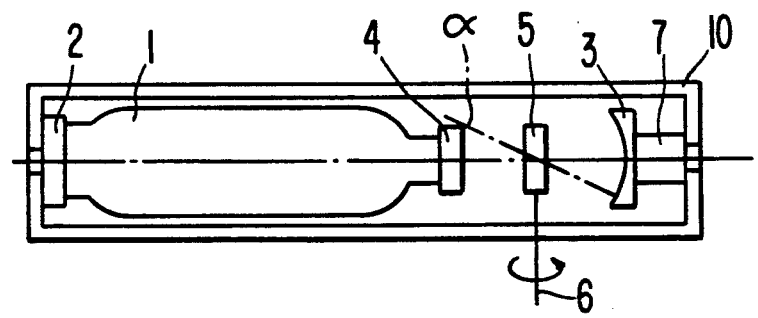

The first embodiment of this invention is shown in FIG. 1. The laser discharge tube [1] is of the same construction as an ordinary He-Ne laser tube, but the window [4] is an anti-reflecting quartz plate instead of a reflecting mirror that only acts as a light window of the discharge tube. The plane reflecting mirror [2] and concave mirror [3] form a laser oscillation cavity. The concave reflecting mirror [3] is fixed on piezoelectric ceramic [7]. The discharge tube [1] with the mirror [2] and the piezoelectric ceramic and the mechanism [6] are supported by the laser shell [10]. Through rotating the quartz crystal plate [5] to change the angle [α]. we can obtain varied magnitude of frequency difference from tens MHz to more than 1000 MHz.

Figure 2:
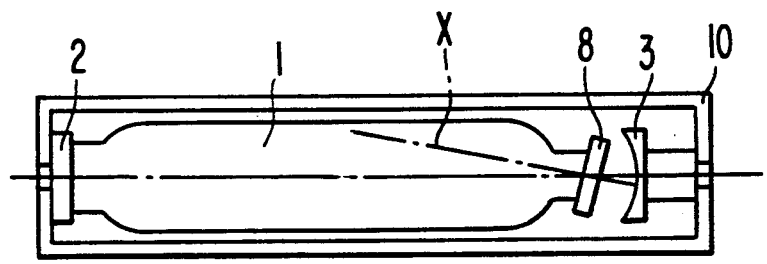
FIG. 2 and FIG. 3. In these Figures [1] is laser discharge tube, [2] is plane reflecting mirror (R=∞), [3] is concave reflecting mirror, [4] is window, [5] is quartz crystal plate, [6] is a mechanism for fixing and rotating the quartz crystal plate. [7] is piezoelectric ceramic for fixing and driving mirror [3], [8] is window plate made of crystal quartz. [9] is quartz crystal plate whose left surface is coasted by anti-reflecting layer and the other surface is coasted by reflecting layer. [10] is the laser shell. [α] is the angle between the crystalline of the quartz plate and the core of the discharge tube.

In FIG. 2, the quartz crystal plate is attached to the end of laser discharge tube as the window as well resulting frequency sptitting. The angle [α] and thickness 1 are in advance decided according to the frequency difference we need. In our tests, we have gotten following frequency differences.

| 37 MHz | for [α] = 3.8° | l = 2.5 mm | L = 180 mm |
| 162 MHz | for [α] = 5° | l = 2.5 mm | L = 180 mm |
| 378 Mhz | for [α] = 7.5° | l = 2.5 mm | L = 180 mm |

Figure 3:
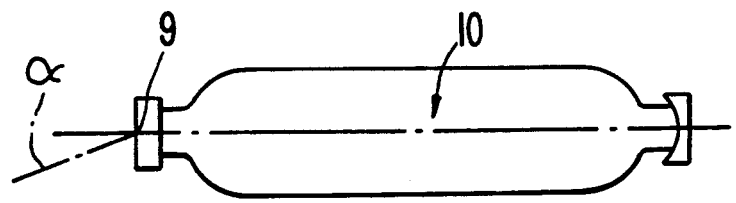

Using the construction of FIG. 3, this invention can be put excution into too. In the construction the right surface of the quartz crystal plate [9] is coated by reflecting layer and left surface of the quartz crystal plate is coasted by anti-reflecting layer.

This invention is of following advantages.

1. Large Range of Frequency Difference

Frequency difference of such three tubes are measured at NIM. Expected frequency differences of 37 MHz. 162 MHz and 378 MHz are obtained. Actually, the frequency difference can be changed from 37 MHz to a longitudinal mode interval of the cavity to meet the need of practical applications. For a cavity with length of 150 mm, the mode interval can be as large as more than 1000 MHz.

2. High Stability of Frequency Difference

The frequency difference of this invention in 'free state' in which piezoelectric ceramic is not applied by any voltage is measured, and the results indicate the stability of frequency difference is about $10^{-5}$ which has the same order as that of acoustic-optic frequency shifter and much better than that of zeeman lasers.

3. Orthogonal Linear Polarization Output

It is very easy to make light beat signal be transformed into electric signal using a polarizer whose polarized direction makes angle of 45° to that of linear polarization light wave modes.

4. The Power-Stabled Short Laser Cab Be Produced

5. Low Cost

The laser tube of this invention can make of ordinary quartz instead of expensive low-expansion quartz. And the acoustic-optic modulator (or Bragg cell) do not needed to get large frequency difference.

We claim:

1. A He-Ne dual frequency laser for generating relatively large frequency differences in the dual frequencies having, in combination, a longitudinally extending laser housing containing a longitudinally extending He-Ne laser gas discharge tube; a plane reflecting mirror disposed at one end of the housing; a concave reflecting mirror disposed near the other end of the housing such that a laser oscillation cavity is defined along the longitudinal axis of the housing between the plane and concave reflecting mirrors; a birefringent quartz crystal plate interposed along said axis in advance of the concave reflecting mirror provided with means for adjusting the same to dispose the crystalline axis thereof at an acute angle off the said longitudinal axis; and means for outputting from the housing the resulting dual frequency laser beam, and in which the said adjusting means is varied to vary the said frequency difference of the dual frequencies from the order of about tens of MHz to in excess of 1000 MHz.

2. A He-Ne dual frequency laser as claimed in claim 1 and in which said adjusting means comprises means for transversely rotating the said quartz crystal plate.

3. A He-Ne dual frequency laser as claimed in claim 1 and in which said adjusting means is varied to vary the said acute angle correspondingly to tune the said frequency difference between the generated dual frequencies.

4. A He-Ne dual frequency laser as claimed in claim 3 and in which the said adjusting means is varied to increase the said acute angle to effect an increase in the said frequency difference.

5. A He-Ne dual frequency laser as claimed in claim 1 and in which the thickness of the said quartz crystal plate is varied to vary the said frequency difference between the generated dual frequencies.

6. A He-Ne dual frequency laser as claimed in claim 1 and in which the said quartz crystal plate is disposed between the said concave reflecting mirror and the other end of the discharge tube, with said other end being provided with a light-polarizing window.

7. A He-Ne dual frequency laser as claimed in claim 6 and in which the opposing surfaces of said quartz crystal plate are coated with anti-reflecting layers.

8. A He-Ne dual frequency laser as claimed in claim 1 and in which the said quartz crystal plate is disposed at the said other end of the discharge tube, also to serve as a window therefor.

9. A He-Ne dual frequency laser as claimed in claim 1 and in which the said quartz crystal plate is disposed at the said one end of the discharge tube, being provided with opposing surfaces provided respectively with reflecting and anti-reflecting layers, with the reflecting layer replacing the said plane reflecting mirror.

10. A He-Ne dual frequency laser for generating relatively large frequency differences in the dual frequencies having, in combination, a longitudinally extending laser housing containing a longitudinally extending He-Ne laser gas discharge tube; a plane reflecting mirror disposed at one end of the housing; a concave reflecting mirror disposed near the other end of the housing such that a laser oscillation cavity is defined along the longitudinal axis of the housing between the plane and concave reflecting mirrors; a birefringent quartz crystal plate interposed along said axis in advance of the concave reflecting mirror provided with means for adjusting the same to dispose the crystalline axis thereof at an acute angle off the said longitudinal axis; and means for outputting from the housing the resulting dual frequency laser beam, and in which the laser cavity length is of the order of 100 mm and less.

* * * * *

UNITED STATES PATENT AND TRADEMARK OFFICE
CERTIFICATE OF CORRECTION

PATENT NO. : 5,091,913

DATED : Feb. 25, 1992

INVENTOR(S) : Shulian Zhang, et al.

It is certified that error appears in the above-identified patent and that said Letters Patent is hereby corrected as shown below:

The title page should be deleted to appear as per attached title page.

Columns 1-6 should be deleted to appear as per attached columns 1-6.

Signed and Sealed this

Twenty-third Day of February, 1993

Attest:

STEPHEN G. KUNIN

Attesting Officer

Acting Commissioner of Patents and Trademarks

United States Patent [19]

Zhang et al.

[11] Patent Number: 5,091,913
[45] Date of Patent: Feb. 25, 1992

[54] QUARTZ CRYSTAL TUNABLE HE-NE DUAL FREQUENCY LASER

[75] Inventors: Shulian Zhang; Sen Yang; Minxian Wu; Kuofam Jin, all of Beijing, China

[73] Assignee: Tsinghua University, Beijing, China

[21] Appl. No.: 507,150

[22] Filed: Apr. 10, 1990

[51] Int. Cl.$^5$ .............................................. H01S 3/106
[52] U.S. Cl. ...................................... 372/23; 372/105; 372/99; 372/20
[58] Field of Search ................. 372/23, 20, 105, 29, 372/55, 99; 350/401

[56] References Cited

U.S. PATENT DOCUMENTS

| | | | |
|---|---|---|---|
| 3,435,370 | 3/1969 | Harris et al. | 372/20 |
| 3,533,015 | 10/1970 | Wuerker | 512/105 |
| 3,549,236 | 12/1970 | Mink | 372/105 |
| 3,605,309 | 9/1971 | Harris et al. | 372/23 |
| 3,786,681 | 1/1974 | Kiehn | 372/20 |
| 3,983,507 | 9/1976 | Tang et al. | 372/105 |
| 4,233,569 | 11/1980 | Liu | 372/105 |
| 4,398,293 | 9/1983 | Hall et al. | 372/32 |
| 4,745,606 | 5/1988 | Uehara et al. | 372/29 |

OTHER PUBLICATIONS

Born and Wolf *Principles of Optics*, Pergamon Press NY Section 14.3.2, 14.4.3 and 14.4.4, 1970.

*Primary Examiner*—William L. Sikes
*Assistant Examiner*—Susan S. Morse
*Attorney, Agent, or Firm*—Rines and Rines

[57] ABSTRACT

A birefringent quartz plate is inserted in the laser cavity to generate two orthogonal polarized beams with different frequencies, and with the amount of frequency difference depending upon the angle of orientation of the crystalline axis of the quartz plate with respect to the longitudinal axis of the laser beam in the cavity. Frequency differences between the generated dual frequency beams can be varied from tens of MHz to more than 1000 MHz, with tuning or variation being effected by a mechanism for rotating the quartz plate. This apparatus provides a dual-frequency laser for interferometry, laser Doppler velocimeters and other applications.

10 Claims, 1 Drawing Sheet

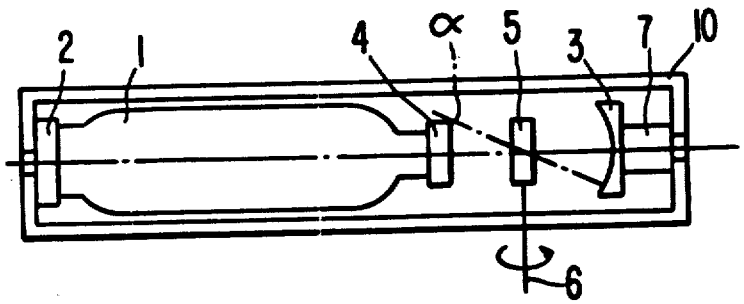

QUARTZ CRYSTAL TUNABLE HE-NE DUAL FREQUENCY LASER

This invention relates to He-Ne dual frequency lasers and the like for generating a large, adjustable frequency difference and relates to a short He-Ne laser cavity for obtaining stabilized power output.

BACKGROUND OF THE INVENTION

Conventional dual frequency lasers are based on combining the Zeeman effect with mode pulling effects, with the laser comprising an ordinary He-Ne laser tube and a magnet which produces a longitudinal magnetic field along the axis of the laser tube. This kind of laser cannot generate a large frequency difference in the dual frequencies. In general, the frequency difference is only about a few megahertz (MHz). In many applications, however, a large frequency difference, such as tens of MHz and even one thousand MHz, is needed.

In laser interferometers, a large frequency difference is, however, used to enhance its measuring speed. For example, the Optodyn Co. (USA) has been using tens of MHz of dual frequency separations in its interferometers. The method of generating such larger frequency differences is to split the laser beam of the ordinary laser into two beams, and then put an acousto-optic modulator (acousto-optic frequency shifter) or Bragg cell, in the path of one of the beams for changing its frequency, so that a large frequency difference arises between the two laser beams.

Large frequency differences are employed also in Doppler velocimeters, such as those of Polytec Co. (West Germany), G. Bouchard (IBM J. RES. Develop. vol. 29, No. 3, 1985) and R. W. Whezien (Optical Engineering, vol. 25, No. 4, 1984).

At the National Institute of Metrology of China (NIM), a special approach has been used for obtaining a 1070 MHz frequency difference with an appropriate, strong, longitudinal magnetic field applied to the He-Ne laser to split the spectrum of Ne atoms.

OBJECTS OF INVENTION

The object of this invention is to provide a new kind of He-Ne dual frequency lasers requiring neither prior art magnetic fields nor acousto-optic modulators or the like for dual frequency beam generation, but a novel construction of reduced cost and simplified construction that, in addition, enables the generation of variable frequency differences ranging from a few MHz to more than one thousand to match the needs of different applications.

An additional but important object of this invention is to provide a novel short (tens of mm) and power-stabilized He-Ne laser, as distinguished from current longer and less stable He-Ne lasers.

Other and further objects will be discussed hereinafter and are more particularly delineated in the appended claims.

SUMMARY OF THE INVENTION

In summary, in accordance with the present invention, a quartz crystal plate is employed in-line in an ordinary He-Ne gas laser cavity with the crystalline axis of the plate adjusted at a generally acute angle $\alpha$ off the axis of the longitudinal gas discharge tube. The quartz crystal plate is a birefringent element having two principal orthogonal orientations. The laser beam exiting the discharge tube and passing through an appropriate quartz window is polarized thereby with a component parallel to one of these principal directions, but with a different index of refraction being presented in the other direction to a polarized component of the beam parallel to said other direction. There are, therefore, two optical path lengths generated as well as two laser frequencies in the single laser cavity. The two wavelengths in the optical paths will occur in the same cavity in accordance with the formula:

$$L = \tfrac{1}{2} q \lambda$$

where L is the optical path cavity length, $\lambda$ is the laser wavelength and q is a large positive and integral number.

While the difference of wavelength resulting from the different optical path lengths is rather small, the difference of generated laser frequencies can be very large, resulting in a laser beam containing two widely separate frequencies (dual frequency laser). It has been found that the larger the angle $\alpha$ between the crystalline axis of the quartz plate and the laser beam axis in the cavity, the larger the tunable frequency difference. Thickening of the quartz crystal plate, furthermore, also produces larger frequency differences. In accordance with our tests, for example, the frequency difference will be about half interval of the longitudinal laser generation mode for an angle $\alpha$ of 8° and a thickness of 2.5 mm of the crystal plate. Other test data is later presented.

THE DRAWINGS

The invention will now be described in connection with the accompanying drawings, FIG. 1 of which is a longitudinal section of a preferred and best mode embodiment of the dual frequency He-Ne laser of the invention; and FIGS. 2 and 3 are similar views of modifications.

DESCRIPTION OF THE INVENTION

Referring to FIG. 1, a longitudinally extending laser discharge tube is shown at 1 of the same general construction as the conventional He-Ne laser tube, mounted in the outer laser shell or housing 10. A plane reflecting mirror (R=∞) is disposed at the left-hand end of the discharge tube 1 at 2, and a window is disposed at 4 at the right-hand end. But the window 4 is in the form of an anti-reflecting quartz window instead of the usual light window for the discharge tube. The plane reflecting mirror 2 and a concave mirror 3, disposed at the right-hand end of the laser housing 10, form the laser longitudinally extending oscillation cavity. The concave reflecting mirror is fixed and driven by a piezoelectric ceramic element 7. Disposed between the quartz window 4 terminating the discharge tube 1 and in advance of the concave mirror 3 at the far end of the laser oscillation cavity is the before-mentioned birefringent quartz crystal plate at 5, shown angularly rotatably adjustable by an externally extending rod or mechanism. The discharge tube 1 with its mirror 2, the concave mirror 3 and its piezoelectric driver 7, and the birefringent quartz crystal plate 5 are all disposed on the common longitudinal axis of the housing 10, and are supported therein. Through rotating the quartz crystal plate 5 to change the angle $\alpha$, variable laser generated frequency differences from tens of MHz to more than 1000 MHz have been tunable in accordance with the before-described phenomenon underlying the invention of generating two optical path lengths and two orthogonally polarized beams of different frequencies in the single laser cavity.

In the modification of FIG. 2, the quartz crystal plate is attached at 8 to the end of laser discharge tube 1, serving as the window, also. The angle α of orientation of the plate 8 and its thickness t are predesigned in advance to meet the frequency differences needed.

From our experiments, the following frequency differences have been thus obtained.

| 37 MHz | for [α] = 3.8° | t = 2.5 mm | L = 180 mm |
|---|---|---|---|
| 162 MHz | for [α] = 5° | t = 2.5 mm | L = 180 mm |
| 378 MHz | for [α] = 7.5° | t = 2.5 mm | L = 180 mm |

Using the modified construction of FIG. 3, the invention can also be carried out. In this embodiment, the quartz crystal plate 9 also functions as the reflecting mirror 2 at the left-hand end of the discharge tube 1, which now serves as the cavity itself with the concave mirror at its right-hand end. To effect this, the opposing surfaces of the quartz crystal plate are coated respectively with a reflecting layer and an anti-reflecting layer.

In all cases, the invention enables an output frequency of approximately twice that of an ordinary laser for the same cavity length, this doubling of the longitudinal mode being achieved through the use of the quartz crystal plate. Thus improved laser characteristics are attainable with shorter cavity lengths, well below 100 mm.

As before stated, it is well known that the power output of the ordinary He-Ne laser is sometimes very unstable, occasionally losing the light beam. The reason is that the mode interval becomes larger than the width of a gain curve of 1500 MHz of Ne in a short cavity, with, indeed, sometimes only one mode working, or none, and resulting in power instability.

With this invention, on the other hand, not only the cavity length can be shortened to well less than 100 mm, but the frequency can be nearly doubled. Though the power of one of the two frequencies can be increased or decreased with time, the total power of these two modes has been found to remain nearly unchanged. With the invention, thus, stable He-Ne lasers are produceable with a length of only a few cm.

The following summarizes advantages obtained by the construction of the present invention:

1. High range of frequency differences. Frequency differences measured at NIM (National Institute of Metrology of China) for the angles α above tabulated were 37 MHz, 162 MHz and 378 MHz. The frequency difference was varied (increased) from the original 37 MHz to different tunable longitudinal mode intervals of the cavity in order to meet the need of practical applications, such as the before-mentioned uses as laser interferometers, Doppler velocimeters and related applications. For a cavity with length of 150 mm, the mode interval can be as large as more than 1000 MHz.

2. High stability of frequency differences. The frequency differences of the invention in "free state", (that is, with the piezoelectric ceramic not activated), were obtained with a stability of frequency difference of about $10^{-5}$—the same order as attainable with the before-mentioned more complicated prior art acousto-optic frequency shifters, and much better than that of Zeeman lasers.

3. Orthogonal linear polarization output. Light beam signals are readily transformed into electric signals by using a polarized window whose polarized direction is at an angle of 45° to that of the linear polarization light wave modes.

4. Power stabilized short lasers can now be produced, as for the applications or uses above described.

5. Low cost. The laser tube of the invention can be made of ordinary quartz instead of expensive low-expansion quartz; and prior art acousto-optic modulators (or Bragg cells) are not needed for obtaining large frequency differences.

Further modifications will also occur to those skilled in this art and such are considered to fall within the spirit and scope of the invention as defined in the appended claims.

What is claimed is:

1. A He-Ne dual frequency laser for generating relatively large frequency differences in the dual frequencies having, in combination, a longitudinally extending laser housing containing a longitudinally extending He-Ne laser gas discharge tube; a plane reflecting mirror disposed at one end of the housing; a concave reflecting mirror disposed near the other end of the housing such that a laser oscillation cavity is defined along the longitudinal axis of the housing between the plane and concave reflecting mirrors; a birefringent quartz crystal plate interposed along said axis in advance of the concave reflecting mirror provided with means for adjusting the same to dispose the crystalline axis thereof at an acute angle off the said longitudinal axis; and means for outputting from the housing the resulting dual frequency laser beam, and in which the said adjusting means is varied to vary the said frequency difference of the dual frequencies from the order of about tens of MHz to in excess of 1000 MHz.

2. A He-Ne dual frequency laser as claimed in claim 1 and in which said adjusting means comprises means for transversely rotating the said quartz crystal plate.

3. A He-Ne dual frequency laser as claimed in claim 1 and in which said adjusting means is varied to vary the said acute angle correspondingly to tune the said frequency difference between the generated dual frequencies.

4. A He-Ne dual frequency laser as claimed in claim 3 and in which the said adjusting means is varied to increase the said acute angle to effect an increase in the said frequency difference.

5. A He-Ne dual frequency laser as claimed in claim 1 and in which the thickness of the said quartz crystal plate is varied to vary the said frequency difference between the generated dual frequencies.

6. A He-Ne dual frequency laser as claimed in claim 1 and in which the said quartz crystal plate is disposed between the said concave reflecting mirror and the other end of the discharge tube, with said other end being provided with a light-polarizing window.

7. A He-Ne dual frequency laser as claimed in claim 6 and in which the opposing surfaces of said quartz crystal plate are coated with anti-reflecting layers.

8. A He-Ne dual frequency laser as claimed in claim 1 and in which the said quartz crystal plate is disposed at the said other end of the discharge tube, also to serve as a window therefor.

9. A He-Ne dual frequency laser as claimed in claim 1 and in which the said quartz crystal plate is disposed at the said one end of the discharge tube, being provided with opposing surfaces provided respectively with reflecting and anti-reflecting layers, with the reflecting layer replacing the said plane reflecting mirror.

10. A He-Ne dual frequency laser for generating relatively large frequency differences in the dual frequencies having, in combination, a longitudinally extending laser housing containing a longitudinally extending He-Ne laser gas discharge tube; a plane reflecting mirror disposed at one end of the housing; a concave reflecting mirror disposed near the other end of the housing such that a laser oscillation cavity is defined along the longitudinal axis of the housing between the plane and concave reflecting mirrors; a birefringent quartz crystal plate interposed along said axis in advance of the concave reflecting mirror provided with means for adjusting the same to dispose the crystalline axis thereof at an acute angle off the said longitudinal axis; and means for outputting from the housing the resulting dual frequency laser beam, and in which the laser cavity length is of the order of 100 mm and less.

* * * * *